UNITED STATES PATENT OFFICE.

ADOLPH BAEYER, OF MUNICH, BAVARIA, ASSIGNOR TO BADISCHE ANILIN AND SODA FABRIK, OF BADEN, GERMANY.

MANUFACTURE OF ARTIFICIAL INDIGO.

SPECIFICATION forming part of Letters Patent No. 235,193, dated December 7, 1880.

Application filed November 9, 1880. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Manufacture of Artificial Indigo, of which the following is a specification.

This invention consists in the discovery that by the action of sulphuric acid upon orthonitrophenylpropiolic acid a new product may be obtained which is capable of being converted into new coloring-matters, or a dye-stuff which I will call "artificial indigo G," upon treatment with a great number of reducing or deoxidizing agents.

In carrying out my invention I take orthonitrophenylpropiolic acid, and in the cold I mix the said acid with sulphuric acid—say, for instance, with from about ten to twenty parts, by weight, of sulphuric acid of about 1.84 specific gravity to every one part, by weight, of orthonitrophenylpropiolic acid employed. In effecting the said mixture care is to be taken to avoid a considerable rise of temperature above, say, 20° centigrade. The mixture thus obtained quickly assumes a bright yellow or orange color, and the reaction is allowed to proceed in the cold until a sample of the mixture, upon being tested for the presence of orthonitrophenylpropiolic acid by means of glucose and alkalies, no longer contains any appreciable quantity of the said acid. The sulphuric-acid mixture thus produced is then submitted to the action of suitable reducing or deoxidizing agents in order to effect the conversion into artificial indigo G.

In practice I have found a great number of substances belonging to various classes of chemical compounds which act as deoxidizing agents upon the above-mentioned new product, and I may specially mention ferrous sulphate, (green vitriol, copperas.)

As an example of the manner in which I prefer to conduct the aforesaid operation, I take the orange-colored mixture resulting from the treatment of one part, by weight, of orthonitrophenylpropiolic acid with about from ten to twenty parts sulphuric acid, as above described, and I mix the same with a solution containing about five parts, by weight, of ferrous sulphate. The mixture is then allowed to stand at the ordinary temperature until the blue color, which it quickly assumes, is fully developed, and the dye-stuff or coloring-matter thus produced may be separated out of the mass by diluting the result of the operation with water, by which the new dye-stuff is precipitated, and may be filtered and washed. The dye-stuff is then ready for use.

The characteristics of my new dye-stuff or coloring-matter prepared according to my above-described process are the following: The dye-stuff or coloring-matter resembles in appearance vegetable indigo, and it can be used in dyeing in a manner similar to it; but it is in a great part soluble in aniline at an ordinary temperature, and also in an aqueous solution of sulphurous acid.

What I claim as new, and desire to secure by Letters Patent, is—

1. As a new article of manufacture, the dye-stuff or coloring-matter produced from orthonitrophenylpropiolic acid by the action of a reducing agent, such as ferrous sulphate, upon the said acid previously treated with sulphuric acid, substantially as described, or by any other means which will produce a like result.

2. The within-described process for the production of a dye-stuff or coloring-matter, by the action of reducing or deoxidizing agents, such as ferrous sulphate, upon a new derivative of orthonitrophenylpropiolic acid, which results from treating the said acid with sulphuric acid in the cold, substantially in the manner herein set forth.

In testimony whereof I have hereunto set my hand in the presence of two subscribing witnesses.

ADOLPH BAEYER.

Witnesses:
WM. PICKHARDT,
G. SIEGLE.